United States Patent
Kim et al.

(10) Patent No.: US 9,311,270 B2
(45) Date of Patent: Apr. 12, 2016

(54) SCHEDULER AND SCHEDULING METHOD FOR RECONFIGURABLE ARCHITECTURE

(71) Applicant: Samsung Electronics Co., Ltd., Suwon-si (KR)

(72) Inventors: Won-Sub Kim, Anyang-si (KR); Yoonseo Choi, Seoul (KR); Hae-Woo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 14/197,591

(22) Filed: Mar. 5, 2014

(65) Prior Publication Data

US 2014/0259020 A1    Sep. 11, 2014

(30) Foreign Application Priority Data

Mar. 5, 2013  (KR) .................. 10-2013-0023492

(51) Int. Cl.
*G06F 9/46* (2006.01)
*G06F 15/78* (2006.01)
*G06F 9/48* (2006.01)

(52) U.S. Cl.
CPC .......... *G06F 15/7885* (2013.01); *G06F 9/4881* (2013.01)

(58) Field of Classification Search
CPC .................................................. G06F 9/4881
USPC ........................................................ 718/102
See application file for complete search history.

(56) References Cited

U.S. PATENT DOCUMENTS

| | | | |
|---|---|---|---|
| 7,606,943 B2* | 10/2009 | Ramchandran | 710/4 |
| 7,840,703 B2 | 11/2010 | Arimilli et al. | |
| 8,281,297 B2* | 10/2012 | Dasu et al. | 717/161 |
| 2009/0070552 A1* | 3/2009 | Kanstein et al. | 712/29 |
| 2010/0122105 A1* | 5/2010 | Arslan et al. | 713/500 |
| 2010/0185839 A1 | 7/2010 | Oh et al. | |
| 2011/0246170 A1 | 10/2011 | Oh et al. | |

FOREIGN PATENT DOCUMENTS

| | | | |
|---|---|---|---|
| KR | 10-2010-0084898 A | 7/2010 | |
| KR | 10-2011-0109590 A | 10/2011 | |
| KR | 10-2012-0095615 A | 8/2012 | |

OTHER PUBLICATIONS

Todman, T.J., et al.; "Reconfigurable Computing: Architectures and Design Methods"; IEE Proceedings—Computers and Digital Techniques 152.2; Mar. 2005; pp. 193-207.*

* cited by examiner

*Primary Examiner* — Qing Chen
*Assistant Examiner* — Clint Thatcher
(74) *Attorney, Agent, or Firm* — NSIP Law

(57) ABSTRACT

A scheduler and scheduling method perform scheduling for a reconfigurable architecture. The scheduling, performed by the scheduler, includes path information extracting including extracting direct path information and indirect path information between functional units in a reconfigurable array complying with predefined architecture requirements, based on architecture information of the reconfigurable array, command selecting including selecting a command from a data flow graph (DFG) showing commands to be executed by the reconfigurable array, and scheduling including scheduling the selected command based on the extracted direct path information and indirect path information.

17 Claims, 4 Drawing Sheets

FIG. 1
REPLACEMENT SHEET
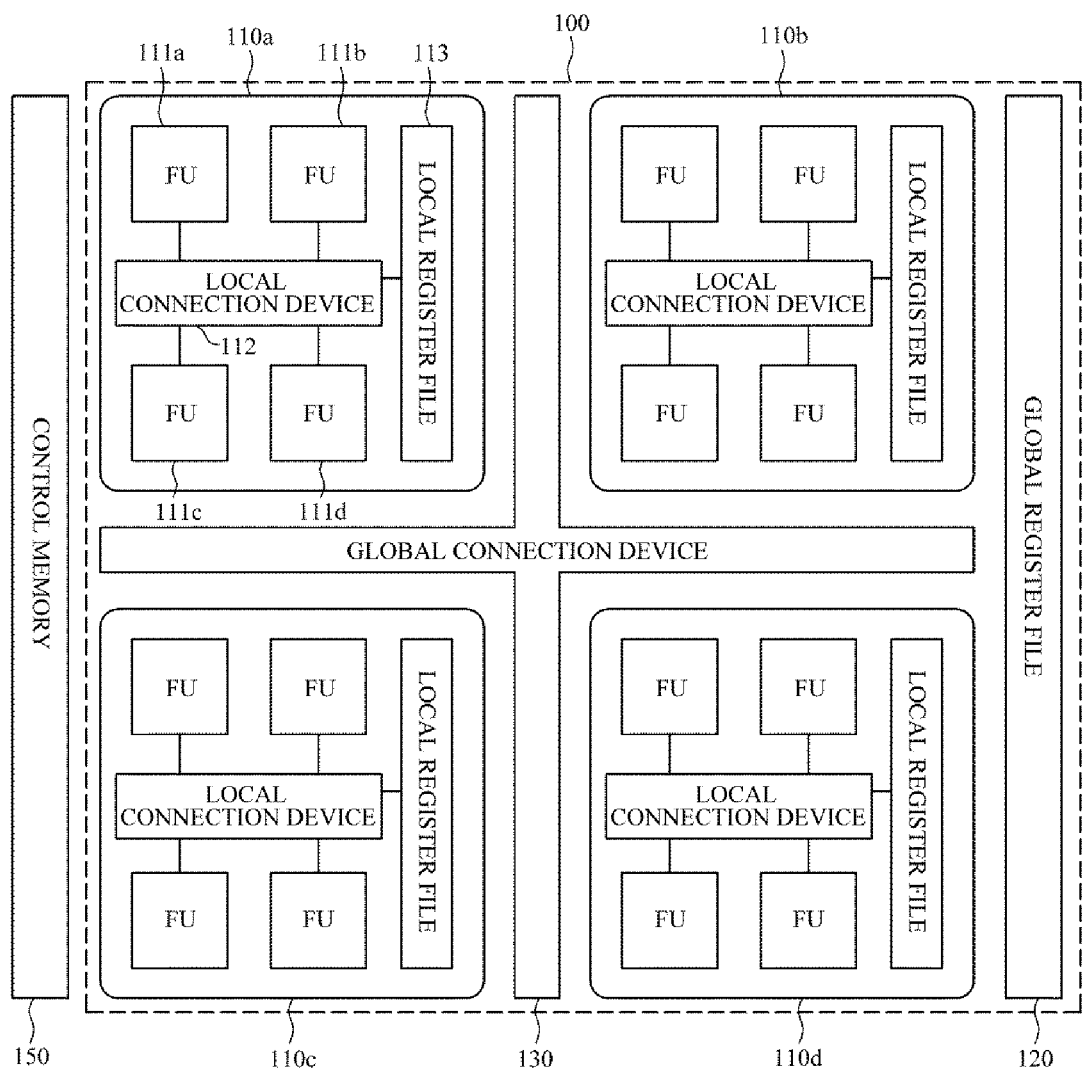

FIG. 2
REPLACEMENT SHEET
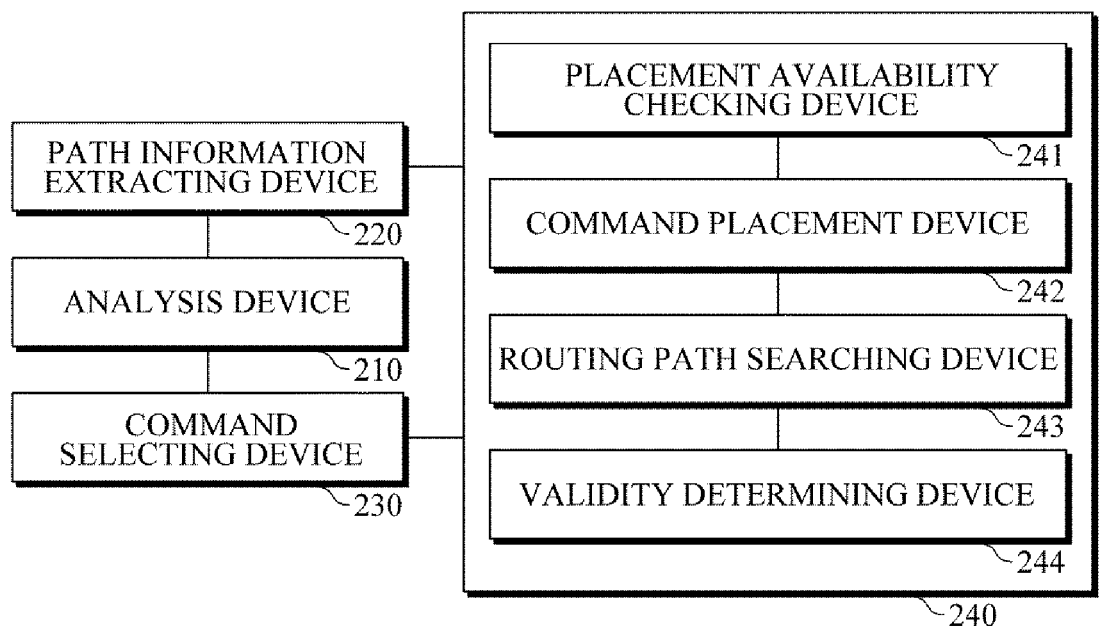

SCHEDULER AND SCHEDULING METHOD FOR RECONFIGURABLE ARCHITECTURE

CROSS-REFERENCE TO RELATED APPLICATION(S)

This application claims the benefit under 35 U.S.C. §119(a) of Korean Patent Application No. 10-2013-0023492, filed on Mar. 5, 2013, in the Korean Intellectual Property Office, the entire disclosure of which is incorporated herein by reference for all purposes.

BACKGROUND

1. Field

The following description relates to a scheduler and scheduling method for a reconfigurable architecture.

2. Description of Related Art

In general, a reconfigurable architecture is an architecture in which the hardware configuration of a computing device may be changed to optimally perform a task.

When a task is processed only by using hardware, it is difficult to efficiently carry out the task if changes occur in the process. This difficulty arises for hardware that has a fixed configuration. In contrast, if a task is processed only by using software, the task may be carried out in a different manner by reconfiguring the software if changes occur in the process of performing a task. However, the processing speed is slower than when the data is processed directly by hardware. Reconfigurable architecture combines the advantages of both hardware and software to process a task.

As the reconfigurable architecture reduces structural resources and hands over much of optimization process to a compiler, more benefits are obtained related to hardware. For example, requirements for factors such surface area, power, and the like may decrease, but meanwhile the complexity of compiling an algorithm is increased, thereby lengthening the compiling time. In particular, an increase in the compiling time may bring about the loss of flexibility, which may be obtained by use of a reconfigurable processor instead of such hardware logic as an Application Specific Integrated Circuit (ASIC), which may be difficult to reconfigure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a scheduler for a reconfigurable architecture includes a path information extracting device configured to extract direct path information and indirect path information between functional units in a reconfigurable array complying with predefined architecture requirements, based on architecture information of the reconfigurable array, a command selecting device configured to select a command from a data flow graph (DFG) representing commands to be executed by the reconfigurable array, and a scheduling device configured to schedule the selected command based on the extracted direct path information and indirect path information.

The reconfigurable array may be a coarse grained reconfigurable array.

The predefined architecture requirements may include that at least one indirect path is present between every two functional units in the reconfigurable array, and that a direct path is present between at least one pair of functional units of the reconfigurable array, and the reconfigurable array may comply with at least one of the predefined architecture requirements.

The scheduling device may be further configured to include a placement validity checking device configured to search for a functional unit and a time that are available for placement of the selected command, a command placement device configured to place the selected command at the functional unit and time found, a routing path searching device configured to search for a routing path between the placed command and a command which has a data dependency with respect to the placed command, based on the direct path information and indirect path information, and a validity determining device configured to determine validity of the found routing path by checking an occupancy state of a node on the routing path.

The routing path searching device may be configured to search for a direct path between two functional units at which the two commands with data dependency with respect to each other are, respectively, placed, based on the direct path information, and, if the search for a direct path search fails, search for an indirect path between the two functional units based on the indirect path information.

The validity determining device may be configured to, when there is a node exclusively connected to either a source node or a destination node on the found routing path, check an occupancy state of remaining nodes on the routing path, other than the exclusively connected node, to determine the validity of the found routing path.

In another general aspect, a scheduling method for reconfigurable architecture includes extracting direct path information and indirect path information between functional units in a reconfigurable array complying with predefined architecture requirements, based on architecture information of the reconfigurable array, selecting a command from a data flow graph (DFG) representing commands to be executed by the reconfigurable array, and scheduling the selected command based on the extracted direct path information and indirect path information.

The reconfigurable array may be a coarse grained reconfigurable array.

The predefined architecture requirements may include that at least one indirect path is present between every two functional units in the reconfigurable array, and that a direct path is present between at least one pair of functional units of the reconfigurable array, and the reconfigurable array complies with at least one of the predefined architecture requirements.

The scheduling of the selected command may further include searching for a functional unit and a time that are available for placement of the selected command, placing the selected command at the functional unit and time found, searching for a routing path between the placed command and a command which has a data dependency with respect to the placed command, based on the direct path information and indirect path information, and a validity determining device configured to determine validity of the found routing path by checking an occupancy state of a node on the routing path.

The searching for the routing path may include searching for a functional unit and a time available for placement of the selected command, placing the selected command at the functional unit and time found, searching for a routing path between the placed command and a command with data dependency with respect to the placed command, based on the direct path information and indirect path information, and determining validity of the found routing path by checking an occupancy state of a node on the routing path.

The determining of the validity of the routing path may include, when there is a node exclusively connected to either a source node or a destination node on the found routing path, checking an occupancy state of remaining nodes on the routing path, other than the exclusively connected node, to determine the validity of the routing path found.

In another general aspect, a reconfigurable architecture includes functional units in a reconfigurable array complying with predefined architecture requirements, based on architecture information of the reconfigurable array, configured to provide direct path information and indirect path information between the functional units to a scheduler, and receive a scheduled command scheduled by the scheduler based on the direct path information and the indirect path information.

The scheduled command may be selected from a data flow graph (DFG) representing commands to be executed by the reconfigurable array.

The reconfigurable array may be a coarse grained reconfigurable array.

The predefined architecture requirements may include that at least one indirect path is present between every two functional units in the reconfigurable array, and that a direct path is present between at least one pair of functional units of the reconfigurable array, and the reconfigurable array complies with at least one of the predefined architecture requirements.

The reconfigurable architecture may be further configured to receive scheduling information for the scheduled command scheduled by the scheduler.

The scheduling information may include an ordered pair including a functional unit identifier and a time.

The reconfigurable architecture may be further configured to execute the scheduled command at the functional unit and time corresponding to the scheduling information.

Other features and aspects will be apparent from the following detailed description, the drawings, and the claims.

BRIEF DESCRIPTION OF THE DRAWINGS

FIG. 1 is a diagram schematically illustrating a coarse grained reconfigurable architecture (CGRA), according to an example embodiment.

FIG. 2 is a diagram illustrating an example of a scheduler for use in a reconfigurable architecture, according to an example embodiment.

Figure 3:
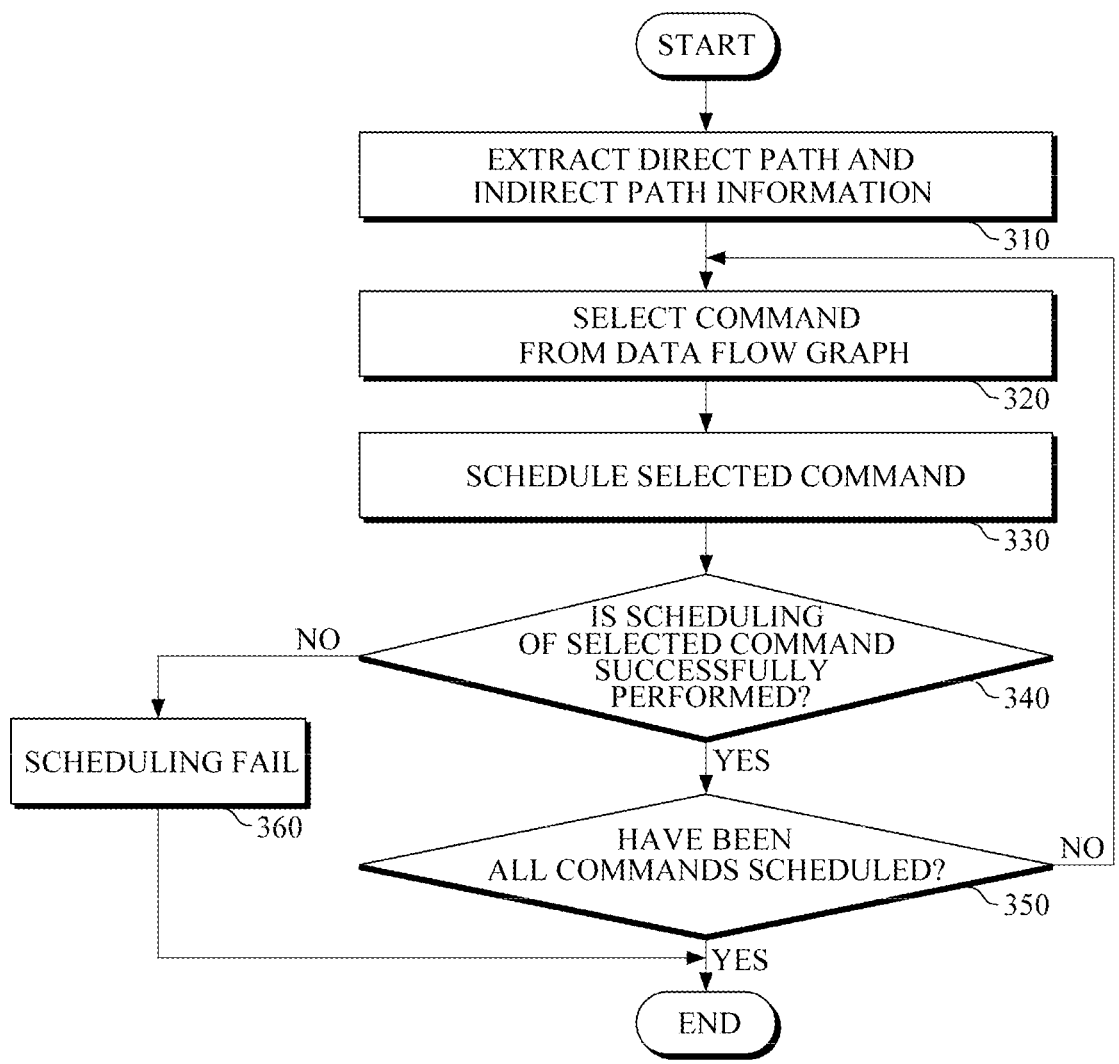
FIG. 3 is a flowchart illustrating an example of a scheduling method for reconfigurable architecture, according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The term "direct path", described herein, refers to the shortest routing path from one functional unit FU1 to another functional unit FU2, which passes through only transitional nodes, such as a multiplexer and a latch, but not the other functional units or a local register file (LRF). The term "indirect path", described herein, refers to the shortest routing path from one functional unit FU1 to another functional unit FU2, but the "indirect path" passes through the LRF and consists of the shortest routing path from FU1 to LRF followed by the shortest routing path from LRF to FU2.

FIG. 1 is a diagram schematically illustrating a coarse grained reconfigurable architecture (CGRA), according to an example embodiment.

In the example embodiment of FIG. 1, a CGRA includes a reconfigurable array 100 and a control memory 150.

The reconfigurable array 100 includes a plurality of functional unit (FU) clusters 110a, 110b, 110c, and 110d, a global register file 120, and a global connection device 130. Each of the FU clusters, such as FU cluster 110a, may include a plurality of FUs. For example, FU cluster includes FUs 111a, 111b, 111c, and 111d, a local register file 113, and a local connection device 112.

For example, the reconfigurable array 100 operates such that the FUs 111a through to 111d each execute a particular command. Here, a command refers to an operation or an instruction carried out by the FUs 111a-111d.

The local register file 113, which is a set of local registers of each FU cluster, such as 110a, temporarily stores data that is used by the FUs 111a through 111d included in that FU cluster, such as 110a.

The local connection device 112 acts as a transition node to establish paths for communication and routing between the FUs 111a through to 111d. For example, the local connection device 1120 includes a multiplexer, a latch, or the like to facilitate communication.

The global register file 120, which is a set of global registers, may temporarily store data that is used by each FU cluster 110a through 110d that is to be accessed on a global basis.

The global connection device 130 as a transition node to establish paths for communication and routing between the FU clusters. The global connection device 130 may also route between the FU clusters and isolated FUs that do not belong to clusters. For example, the global connection device 130 includes a multiplexer, a latch, or the like to facilitate communication.

Although the reconfigurable array 100 is illustrated as a coarse grained array in FIG. 1, embodiments are not limited thereto. While some embodiments include a coarse grained array, other embodiments include other types of reconfigurable hardware, such as other types of arrays that may be used to act in similar roles in other embodiments.

The control memory 150 stores commands or configuration data that are related to a particular program. Such control memory 150 acts as a repository that includes information used by the FU clusters to perform operations related to an executing program. The configuration data refers to information about links and characteristics of the interaction between elements of the reconfigurable array 100. For example, the configuration of the reconfigurable array 100 may be altered according to the configuration data present in the control memory 150. Thus, by changing the configuration data in the control memory 150, the reconfigurable array 100 operates as if it had a different hardware configuration, but there is no requirement for a change of a hardwired architectural configuration.

The example described herein assumes that the CGRA meets the following requirements. Note that the intended usages of "direct path" and "indirect path" have been described above.

First, at least one indirect path should be established between every two FUs on the CGRA.

Second, a direct path may be established between two arbitrary FUs on the CGRA.

Third, all FUs belonging to one FU cluster have direct connections to all local register files in that FU cluster. However, the direct connections may include shared architecture elements (e.g., a read/write port of a local register file). Because of the possibility of shared architecture elements, simultaneous access of multiple FUs may not be possible.

The example illustrated in FIG. 1 has four FU clusters, and each FU cluster includes four FUs. However, embodiments are not limited thereto. There may be more or less than four FU clusters, and each FU cluster may have more or less than four FUs within the cluster.

The example described hereinafter assumes that a reconfigurable array or reconfigurable architecture complies with the above architectural requirements.

FIG. 2 is a diagram illustrating an example of a scheduler for use in a reconfigurable architecture, according to an example embodiment.

Referring to FIG. 2, a scheduler 200 includes an analysis device 210, path information extracting device 220, a command selecting device 230, and a scheduling device 240. A source application is converted to intermediate code during preprocessing. Intermediate code refers to a code suitable for optimization, into which a compiler reads and parses the source application during preprocessing.

The analysis device 210 analyzes the intermediate code to perform various optimizations on the intermediate code.

In an example, the analysis device 210 generates a data flow graph (DFG) showing commands to be assigned to the reconfigurable array 100, and the data dependency between the commands. In such an example, in the data flow graph generated by the analysis device 210, nodes represent the commands to be allocated to FUs in the reconfigurable array 100, and the edges between the nodes represent data dependency between the commands.

Continuing the example, the analysis device 210 generates an architecture graph showing FUs that are present in the reconfigurable array 100, and the connectivity between the FUs. For example, in the architecture graph generated by the analysis device 210, nodes represent the FUs in the reconfigurable array 100, and the edges between the nodes represent the connectivity between the FUs.

The path information extracting device 220 extracts direct path information and indirect path information between the FUs based on the architecture graph previously generated by the analysis device 210.

The command selecting device 230 prioritizes the commands by analyzing the execution order and/or dependencies between the commands, based on the data flow graph generated by the analysis device 210, and selects commands according to the given priorities. For example, the command selecting device 230 selects the commands with higher priorities first.

The scheduling device 240 determines which FU will execute the corresponding command selected. In this case, the scheduling device 240 schedules the selected command based on the direct path information and indirect path information extracted by the path information extracting device 220.

In addition, in an example the scheduling device 240 includes a placement availability checking device 241, a command placement device 242, a routing path searching device 243, and a validity determining device 244.

The placement availability checking device 241 searches for an FU and a time available for the placement and execution of the selected command. For example, the placement availability checking device 241 searches for an FU that can process the selected command, and schedules a time for the found FU to process the command. If the available FU and time are not found, scheduling by the scheduling device 240 is regarded as "failed".

The command placement device 242 performs placement of the corresponding command based on the search result of the placement availability checking device 241. For example, if found FUs and scheduled times are designated as ordered pairs, such as (FU, scheduled time), the command placement device 242 may select an arbitrary ordered pair (FU, scheduled time) from among the several ordered pairs, and perform placement of the corresponding command to be executed by an FU at a certain time based on the selected ordered pair.

The routing path searching device 243 searches for a routing path between the placed command or a node corresponding to the command, and another command or a predecessor node. The search is carried out using data dependency information in relation to the placed command, by using the direct path information and indirect path information extracted by the path information extracting device 220. Thus, the search is performed so as to perform routing between all edges connected to the placed command or the node corresponding to the command.

For example, assuming that command 2 is dependent on command 1, which is scheduled to be performed at (FU1, t0), and command 2 is scheduled to be performed at (FU2, t2), the routing path searching device 243 searches for a direct path between FU1 and FU2. If the search fails to find a direct path, the routing path searching device 243 searches for an indirect path between FU1 and FU2. Thus, in an embodiment, the routing path searching device 243 searches for an indirect path only in the absence of a direct path.

The validity determining device 244 determines the validity of a routing path found by the routing path searching device 243 by checking particular nodes on the routing path. For example, if some nodes or entities on the found routing path are each exclusively connected to either a source node or a destination node, the validity determining device 244 checks the occupancy state of the other nodes or entities on the routing path, and determines the validity of the routing path based on the check. For example, if a routing path, such as FU1->A->B->C->FU2, is found where A is a node or an entity exclusively connected to FU1 and C is a node or an entity exclusively connected to FU2, the validity determining device 244 checks the occupancy state of node B only and determines the validity of the routing path based on the check.

In this example, if node B is empty, the validity determining device 244 determines that the routing path is valid, and then completes scheduling of the corresponding command. Otherwise, the validity determining device 244 determines that the routing path is not valid.

If an embodiment determines that all routing paths found are not valid, the command placement device 242 places the corresponding command at a different FU and a different time provided by the placement availability checking device 241. Based on this different FU and different time, the scheduling device 240 performs routing again for edges connected to the command or a node corresponding to the command.

However, if it is not possible to establish a routing path valid to any FUs and at any scheduled times that are provided by the placement availability checking device 241, scheduling by the scheduling device 240 is regarded as "failed".

Although FIG. 2 illustrates that the analysis device 210 is implemented within the scheduling device 200, the embodiments are not limited thereto, such that the analysis device 210 may be located and implemented partially or totally outside of the scheduling device 200.

FIG. 3 is a flowchart illustrating an example of a scheduling method for reconfigurable architecture, according to an example embodiment.

Referring to FIG. 3, in operation 310, the method extracts direct path information and indirect path information between FUs that are present in a reconfigurable array based on architecture information of the reconfigurable array.

Then, in operation 320, the method selects a command from a data flow graph (DFG) showing commands to be executed in the reconfigurable array.

In operation 330, the method schedules the selected command based on the direct path information and indirect path information.

Then, in operation 340, the method determines whether scheduling of the selected command is successfully performed. If the scheduling is performed successfully, in operation 350, it is determined whether scheduling of all commands on the DFG is performed. If in operation 350 the determination is made that all commands are scheduled, the scheduling process is terminated. Otherwise, the process proceeds to operation 320, and a command that has not been scheduled yet is selected.

If the method makes a determination that scheduling the selected command fails in operation 340, such that scheduling is not successfully performed, the method regards the scheduling process as failed in operation 360.

Figure 4:
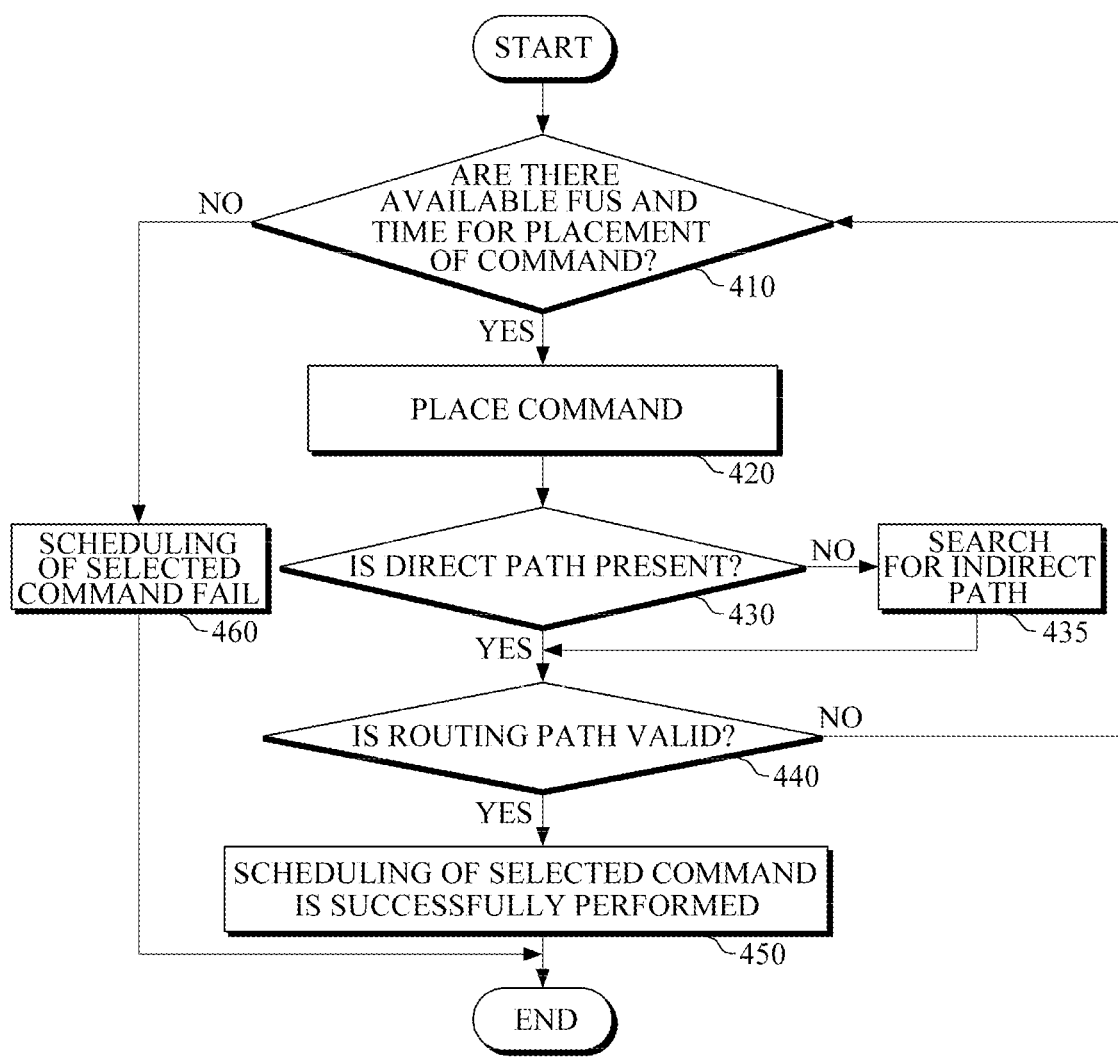
FIG. 4 is a flowchart illustrating the scheduling process of operation 330 of FIG. 3, according to an example embodiment.

FIG. 4 is a flowchart illustrating the scheduling process of operation 330 of FIG. 3, according to an example embodiment.

Referring to FIG. 4, in operation 410 the method determines whether there are FUs and times available for the placement of the selected command. For example, an ordered pair (FU, scheduled time) designating a FU and scheduled time available for the placement of the selected command are found, from a number of candidate ordered pairs.

Then, in operation 420, if the method determines in operation 410 that the ordered pair of FU and scheduled time that are available for placement of the selected command was determined to be available in operation 410, the method places the selected command at the found FU and scheduled time. For example, the method performs placement of the command at an FU and scheduled time selected from the found ordered pairs of (FU, scheduled time).

In operation 430, the method determines whether a direct path is present between the placed command and a command with a data dependency in relation to the placed command.

For example, assuming that command 1 is a predecessor command of command 2, command 1 is scheduled at (FU1, t0) and command 2 is scheduled at (FU2, t2), a direct path between FU1 and FU2 is searched. For example, the direct path information extracted in 310 of FIG. 3 is used in this process.

If it is determined that there is a direct path in operation 430, in operation 440 the method takes the direct path as a routing path, and the method determines the validity of the routing path. At this time, only a particular node on the routing path may be checked to determine the validity. For example, when there are some nodes that are each exclusively connected to either a source node or a destination node on a corresponding routing path, the validity of the routing path may be determined by checking the occupancy state of the other nodes on the routing path. As an example, if there is a routing path, FU1->A->B->C->FU2, where A is a node exclusively connected to FU1 and C is a node exclusively connected to FU2, the validity of the routing path can be determined by only checking the occupancy state of node B, as node B is not exclusively connected to either a source node or a destination node. If node B is empty, the method may determine that the routing path is valid, otherwise, the method may determine that the routing path is not valid.

If a determination is made in operation 440 that the routing path is valid, the method determines in operation 450 that the scheduling of the selected command is performed successfully in operation 450. If a determination is made in 440 is made that the routing path is not valid, the method proceeds to operation 410, and it is determined again whether there are FUs and scheduled times that are available for the placement of the selected command.

If a determination in 410 is made that no FU and scheduled time are available for the placement of the selected command, the method regards scheduling the selected command as failed in operation 460.

If a determination is made in operation 430 that there is no direct path, the method search for an indirect path between the placed command and a command with data dependency in relation to the placed command in 435. For example, as provided above, if command 1 is a predecessor command of command 2, command 1 is scheduled at (FU1, t0) and command 2 is placed at (FU2, t2), the method searches for an indirect path between FU1 and FU2. At this time, for example, the indirect path information extracted in 310 of FIG. 3 is used. In this case, the indirect path found is taken as a routing path and the validity of the indirect path, as the routing path, is determined in operation 440.

In an example, the routing path searching operations 430 and 432 and the routing path validity determination operation 440 may be represented in pseudo-code as follows:

Sample Code 1

```
{Pred(n)is a set of predecessor of node n}
for each p in Pred(n)
   SR := GetValidRoutingPaths(p, n, t(p), t(n));
   for each routing path rp in SR
      Check time and resource conflicts of checkpoints in rp;
   endfor
endfor
```

In Sample Code 1, SR is assigned to include a set of valid routing paths, and "checkpoints" denote particular nodes to be checked for determining the validity of each routing path. Thus, Sample Code 1 operates by finding all routing paths to a node by deriving valid routing paths based on each predecessor and the node, and the timing information t(p) and t(n) that are associated with the predecessor and the node. For each routing path in the found routing paths, the routing checks that the routing path does not lead to conflicts. Hence, by performing the operations provided in Sample Code 1, the operations systematically derive and validate potential routing paths. However, the pseudo-code is only one example approach for performing the routing path searching operations 430 and 432 and the routing path validity determination operation 440. In other embodiments, different approaches that include different operations may be used to provide similar results.

The examples of a scheduler and scheduling method for reconfigurable architecture may improve the performance of the reconfigurable architecture by providing the ability to analyze aspects of how operations should be scheduled in advance, optimizing the ability of the reconfigurable architecture to organize how operations are carried out by scheduling operations in the most efficient manner based on the resources provided by the reconfigurable architecture and how they are interconnected and allocated.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A scheduler for a reconfigurable architecture comprising:
   a path information hardware processor configured to extract direct path information and indirect path information between functional units in a reconfigurable array complying with predefined architecture requirements, based on architecture information of the reconfigurable array;
   a command hardware processor configured to select a command from a data flow graph (DFG) representing commands to be executed by the reconfigurable array; and
   a scheduling hardware processor configured to schedule the selected command based on the extracted direct path information and indirect path information,
   wherein the scheduling hardware processor is configured to search for a direct path between two functional units at which the selected command and a command, which has a data dependency with respect to the selected command, are, respectively, placed, based on the direct path information, and, if the search for a direct path search fails search for an indirect path between the two functional units based on the indirect path information.

2. The scheduler of claim 1, wherein the reconfigurable array is a coarse grained reconfigurable array.

3. The scheduler of claim 1, wherein the predefined architecture requirements comprise that at least one indirect path is present between every two functional units in the reconfigurable array, and that a direct path is present between at least one pair of functional units of the reconfigurable array, and the reconfigurable array complies with at least one of the predefined architecture requirements.

4. The scheduler of claim 1, wherein
   the scheduling hardware processor is further configured to comprise:
      a placement validity checking device configured to search for a functional unit and a time that are available for placement of the selected command;
      a command placement device configured to place the selected command at the functional unit and time found;
      a routing path searching device configured to search for a routing path between the placed command and a command which has a data dependency with respect to the placed command, based on the direct path information and indirect path information; and
      a validity determining device configured to determine validity of the found routing path by checking an occupancy state of a node on the routing path.

5. The scheduler of claim 4, wherein the validity determining device is configured to, when there is a node exclusively connected to either a source node or a destination node on the found routing path, check an occupancy state of remaining nodes on the routing path, other than the exclusively connected node, to determine the validity of the found routing path.

6. A scheduling method for reconfigurable architecture comprising:
   extracting, at a path information hardware processor, direct path information and indirect path information between functional units in a reconfigurable array complying with predefined architecture requirements, based on architecture information of the reconfigurable array;
   selecting, at a command hardware processor, a command from a data flow graph (DFG) representing commands to be executed by the reconfigurable array; and
   scheduling, at a scheduling hardware processor, the selected command based on the extracted direct path information and indirect path information,
   wherein the scheduling of the selected command comprises,
      searching for a direct path between two functional units at which the selected command and a command, which has a data dependency with respect to the selected command, are, respectively, placed, based on the direct path information, and
      if the search for a direct path search fails, searching for an indirect path between the two functional units based on the indirect path information.

7. The scheduling method of claim 6, wherein the reconfigurable array is a coarse grained reconfigurable array.

8. The scheduling method of claim 6, wherein the predefined architecture requirements comprise that at least one indirect path is present between every two functional units in the reconfigurable array, and that a direct path is present between at least one pair of functional units of the reconfigurable array, and the reconfigurable array complies with at least one of the predefined architecture requirements.

9. The scheduling method of claim 6, wherein the scheduling of the selected command further comprises:
   searching for a functional unit and a time that are available for placement of the selected command;
   placing the selected command at the functional unit and time found;
   searching for a routing path between the placed command and a command which has a data dependency with respect to the placed command, based on the direct path information and indirect path information; and
   determining validity of the found routing path by checking an occupancy state of a node on the routing path.

10. The searching method of claim 9, wherein the determining of the validity of the routing path comprises, when there is a node exclusively connected to either a source node or a destination node on the found routing path, checking an occupancy state of remaining nodes on the routing path, other than the exclusively connected node, to determine the validity of the routing path found.

11. A reconfigurable architecture comprising: functional units in a reconfigurable array complying with predefined architecture requirements, based on architecture information of the reconfigurable array, configured to: provide direct path information and indirect path information between the functional units to a scheduler; and receive a scheduled command scheduled by the scheduler based on the direct path information and the indirect path information, wherein the scheduler is further configured to search for a direct path between two functional units at which the selected command and a command, which has a data dependency with respect to the selected command, are, respectively, placed, based on the direct path information, and, if the search for a direct path search fails, search for an indirect path between the two functional units based on the indirect path information.

12. The reconfigurable architecture of claim 11, wherein the scheduled command is selected from a data flow graph (DFG) representing commands to be executed by the reconfigurable array.

13. The reconfigurable architecture of claim 11, wherein the reconfigurable array is a coarse grained reconfigurable array.

14. The reconfigurable architecture of claim 11, wherein the predefined architecture requirements comprise that at least one indirect path is present between every two functional units in the reconfigurable array, and that a direct path is present between at least one pair of functional units of the reconfigurable array, and the reconfigurable array complies with at least one of the predefined architecture requirements.

15. The reconfigurable architecture of claim 11, wherein the reconfigurable architecture is further configured to receive scheduling information for the scheduled command scheduled by the scheduler.

16. The reconfigurable architecture of claim 15, wherein the scheduling information comprises an ordered pair including a functional unit identifier and a time.

17. The reconfigurable architecture of claim 16, wherein the reconfigurable architecture is further configured to execute the scheduled command at the functional unit and time corresponding to the scheduling information.

\* \* \* \* \*